(12) United States Patent
Schloemer (10) Patent No.: US 11,870,543 B2
(45) Date of Patent: Jan. 9, 2024

(54) DATA TRANSMISSION SYSTEMS AND METHODS FOR LOW EARTH ORBIT SATELLITE COMMUNICATIONS

(71) Applicant: STAR MESH LLC, Princeton Junction, NJ (US)

(72) Inventor: Gerald R. Schloemer, Round Lake, IL (US)

(73) Assignee: STAR MESH LLC, Princeton Junction, NJ (US)

( * ) Notice: Subject to any disclaimer, the term of this patent is extended or adjusted under 35 U.S.C. 154(b) by 137 days.

(21) Appl. No.: 17/322,950

(22) Filed: May 18, 2021

(65) Prior Publication Data

US 2021/0359751 A1 Nov. 18, 2021

Related U.S. Application Data

(60) Provisional application No. 63/182,341, filed on Apr. 30, 2021, provisional application No. 63/136,664, (Continued)

(51) Int. Cl.
H04B 7/185 (2006.01)
H04B 7/195 (2006.01)
(Continued)

(52) U.S. Cl.
CPC ......... *H04B 7/18521* (2013.01); *H04B 7/195* (2013.01); *H04B 7/204* (2013.01); *H04L 1/0047* (2013.01); *H04L 1/0061* (2013.01)

(58) Field of Classification Search
None
See application file for complete search history.

(56) References Cited

U.S. PATENT DOCUMENTS 3,017,777 A 1/1962 Haeussermann
3,815,140 A 6/1974 Buehler et al.
(Continued)

FOREIGN PATENT DOCUMENTS

CN 102027695 4/2011
CN 1728714 7/2011
(Continued)

OTHER PUBLICATIONS

Cox, Donald C., "Wireless Network Access for Personal Communications," IEEE Communications Magazine (Dec. 1992), pp. 96-115.
(Continued)

*Primary Examiner* — Shripal K Khajuria
(74) *Attorney, Agent, or Firm* — David M. Quinlan, P.C.

(57) ABSTRACT

A radio communication system transmits data between terrestrial sites using one or more stochastically distributed orbiting satellites. The satellites and ground stations have the capability of sending and receiving data content in different radio technologies (signal formats) and over different satellite routes. Data content is assembled into packets and divided into segments and transmitted multiple times in different signal formats and/or over different routes, with each segment including error correction coding. A system node (satellite or ground station) that receives the multiple data packets applies error correction to each segment and re-assembles the data content from the separate segments in each transmission deemed to have the fewest errors.

32 Claims, 4 Drawing Sheets

Related U.S. Application Data filed on Jan. 13, 2021, provisional application No. 63/132,026, filed on Dec. 30, 2020, provisional application No. 63/120,409, filed on Dec. 2, 2020, provisional application No. 63/026,180, filed on May 18, 2020.

(51) Int. Cl.
*H04B 7/204* (2006.01)
*H04L 1/00* (2006.01)

(56) References Cited

U.S. PATENT DOCUMENTS

| | | |
|---|---|---|
| 4,937,822 A | 6/1990 | Weddle et al. |
| 4,965,850 A | 10/1990 | Schloemer |
| 5,274,840 A | 12/1993 | Schwendeman |
| 5,303,286 A | 4/1994 | Wiedeman |
| 5,410,728 A | 4/1995 | Bertiger et al. |
| 5,551,624 A | 9/1996 | Horstein et al. |
| 5,561,836 A | 10/1996 | Sowles et al. |
| 5,566,354 A | 10/1996 | Schloemer |
| 5,574,968 A | 11/1996 | Olds et al. |
| 5,716,029 A | 2/1998 | Spitzer et al. |
| 5,757,784 A | 5/1998 | Liebowitz et al. |
| 5,793,842 A | 8/1998 | Schloemer et al. |
| 5,812,545 A | 9/1998 | Liebowitz et al. |
| 5,959,999 A | 9/1999 | An |
| 6,208,312 B1 | 3/2001 | Gould |
| 6,219,003 B1 | 4/2001 | Chandler |
| 6,295,283 B1 | 9/2001 | Falk |
| 6,404,769 B1 | 6/2002 | Kapoor |
| 6,459,899 B1 | 10/2002 | Schloemer |
| 6,775,251 B1 | 8/2004 | Wiedeman et al. |
| 6,823,170 B1 | 11/2004 | Dent |
| 6,985,454 B1 | 1/2006 | Wiedeman et al. |
| 7,292,186 B2 | 11/2007 | Miller et al. |
| 7,502,382 B1 | 3/2009 | Liu et al. |
| 7,925,167 B1 | 4/2011 | Kozubal et al. |
| 8,816,933 B2 | 8/2014 | Scott et al. |
| 8,918,047 B1 | 12/2014 | Teller et al. |
| 9,035,839 B2 | 5/2015 | Scott et al. |
| 9,220,047 B2 | 12/2015 | Furukawa et al. |
| 9,748,989 B1 | 8/2017 | Freedman et al. |
| 10,063,309 B2 | 8/2018 | Laufer et al. |
| 10,084,536 B1 | 9/2018 | Schloemer |
| 10,084,615 B2 | 9/2018 | Hong et al. |
| 10,085,200 B1 | 9/2018 | Schloemer |
| 10,291,316 B1 | 5/2019 | Schloemer |
| 10,447,381 B2 | 10/2019 | Schloemer |
| 10,770,790 B1 | 9/2020 | Mahanfar |
| 10,784,953 B2 | 9/2020 | Schloemer |
| 10,791,493 B2 | 9/2020 | Schloemer |
| 10,979,136 B2 | 4/2021 | Schloemer |
| 10,998,962 B2 | 5/2021 | Schloemer |
| 11,038,586 B2 | 6/2021 | Schloemer |
| 11,206,079 B2 | 12/2021 | Schloemer |
| 11,356,921 B2 | 6/2022 | Schloemer |
| 2005/0207375 A1 | 9/2005 | Schiff |
| 2006/0023717 A1 | 2/2006 | Trachtman et al. |
| 2007/0070939 A1 | 3/2007 | Hottinen |
| 2007/0075896 A1 | 4/2007 | Whitehead et al. |
| 2008/0056189 A1 | 3/2008 | Hudson et al. |
| 2008/0219266 A1 | 9/2008 | Agarwal et al. |
| 2008/0278397 A1 | 11/2008 | Rao et al. |
| 2010/0128678 A1 | 5/2010 | Thesling |
| 2010/0217879 A1 | 8/2010 | Weiner |
| 2011/0287791 A1 | 11/2011 | Fujishima et al. |
| 2013/0148250 A1 | 6/2013 | Day et al. |
| 2013/0293415 A1 | 11/2013 | Gutt et al. |
| 2014/0017992 A1 | 1/2014 | Bigras et al. |
| 2014/0027576 A1 | 1/2014 | Boshuizen et al. |
| 2014/0177522 A1* | 6/2014 | Marshack ............ H04B 7/1858 370/316 |
| 2014/0240449 A1 | 8/2014 | Shefer |
| 2014/0240497 A1 | 8/2014 | Shefer |
| 2015/0131512 A1 | 5/2015 | Lauer et al. |
| 2016/0037434 A1 | 2/2016 | Gopal et al. |
| 2016/0080072 A1 | 3/2016 | Baudoin et al. |
| 2016/0112117 A1 | 4/2016 | Platzer et al. |
| 2016/0365629 A1 | 12/2016 | Yao et al. |
| 2017/0070939 A1 | 3/2017 | Chong et al. |
| 2017/0155443 A1 | 6/2017 | Haziz et al. |
| 2018/0156924 A1 | 6/2018 | Reedy et al. |
| 2019/0097754 A1* | 3/2019 | Yu ............................ H04L 1/20 |
| 2019/0353799 A1 | 11/2019 | Grant et al. |
| 2020/0024012 A1 | 1/2020 | Fortezza |
| 2021/0036806 A1* | 2/2021 | Lee ........................ H04L 1/1685 |

FOREIGN PATENT DOCUMENTS

| | | |
|---|---|---|
| CN | 103281115 | 9/2013 |
| CN | 102301774 | 4/2014 |
| CN | 104661276 A | 5/2015 |
| CN | 106788682 A | 5/2017 |
| CN | 106664507 | 12/2020 |
| EP | 1523062 | 4/2005 |
| IN | 4263/CHE/2013 | 3/2015 |
| JP | 677889 | 3/1994 |
| WO | 2009123112 | 10/2009 |
| WO | 2009139778 | 11/2009 |
| WO | 2015184055 | 12/2015 |
| WO | 2016060954 | 4/2016 |

OTHER PUBLICATIONS

Satellite Systems Engineering in an IPv6 Environment, Minoli, Daniel, CRC Press, Boca Raton, FL (2009), pp. 78-80.
Chabot, J. A., "A Spherical Magnetic Dipole Actuator for Spacecraft Attitude Control," Thesis for M.S. in Aerospace Engrg. Sciences, Univ. of Colorado, 2015.
"Iridium Satellite Constellation," Wikipedia, https://en.wikipedia.org/wiki/Iridium (last visited May 9, 2017).
"Project Loon," Wikipedia, https://en.wikipedia.org/wiki/Project_Loon (last visited Sep. 27, 2017).
Wade, P., "Multiple Reflector Dish Antennas," copyright 2004.
International Search Report in PCT/US2017/48110, dated Nov. 3, 2017.
Invitation to Pay Additional Fees dated Nov. 14, 2018, in PCT appln. No. PCT/US2018/053002.
International Search Report and Written Opinion dated Jan. 22, 2019, in PCT appln. No. PCT/US2018/053002.
International Search Report and Written Opinion dated Apr. 8, 2019, in PCT appln. No. PCT/US2018/064041.
International Search Report and Written Opinion dated Nov. 12, 2019, in PCT appln. No. PCT/US2019/041428.
Supplementary European Search Report dated Feb. 25, 2020, in EP appln. No. 17844319.8 (PCT/US2017/048110).
Chakraborty, D., "Survivable Communication Concept via Multiple Low Earth-Orbiting Satellites," IEEE Transactions on Aerospace and Electronic Systems, vol. 25, No. 6 (Nov. 1989), pp. 879-889.
Chung, Soon-Jo, et al., "Review of Formation Flying and Constellation Missions Using Nanosatellites," Journal of Spacecraft and Rockets, vol. 53, No. 3, pp. 567-578 (May-Jun. 2016).
Qu, et al., "LEO Satellite Constellation for Internet of Things," IEEE Access, vol. 5, pp. 18391-18401, Digital Object Identifier 10.1109/ACCESS.2017.2735988, first pub. Aug. 4, 2017 (Sep. 27, 2017).
EPO office action in EP appln. No. 18860787.3-1215, dated May 21, 2021.
Official Action in Chinese Appln. No. 2018800627936, dated Jul. 28, 2021.

* cited by examiner

DATA TRANSMISSION SYSTEMS AND METHODS FOR LOW EARTH ORBIT SATELLITE COMMUNICATIONS

CROSS-REFERENCE TO RELATED APPLICATIONS

This application claims benefit of the assignee's U.S. provisional application No. 63/026,180 filed May 18, 2020, U.S. provisional application No. 63/120,409 filed Dec. 2, 2020, U.S. provisional application No. 63/132,026 filed Dec. 30, 2020, U.S. provisional application No. 63/136,664 filed Jan. 13, 2021, and U.S. provisional application No. 63/182,341 filed Apr. 30, 2021, the entire contents of all of which are incorporated by reference as part of the present disclosure as if set out in full herein. Also incorporated by reference as part of the present disclosure as if set out in full herein is the assignee's U.S. Pat. No. 10,979,136 issued Apr. 13, 2021.

BACKGROUND OF THE INVENTION

Field of the Invention

The present invention relates to transmitting data from one terrestrial node to another or from one satellite node to another, and more particularly, to communications systems and methods using novel routing protocols and node designs for establishing radio links between satellites and terrestrial nodes, and still more particularly, to such systems and methods employing multiple satellites in low earth orbits, preferably distributed stochastically at indeterminate geolocations that do not require precision attitude control.

Description of Related Art

The internet has proved to be an important part of the world economy. Along with the introduction of the internet, there have been numerous methods of providing internet access around the world. In the United States, both the traditional "twisted pair" used by for POTS ("Plain Old Telephone Service"), and fiber optic cables have been used to connect to the internet. Cellular radio has also proved to be of value in providing internet service. The economic complex created by these three approaches is very large.

Around 20 years ago, Motorola's Iridium venture demonstrated that low earth orbit ("LEO") satellites could provide telephone service. Recently, several mid-sized companies have used either geo-stationary ("GEO") or LEO satellites to provide some level of data and/or internet service.

A GEO satellite has an orbital period of 24 hours, and if deployed in an equatorial orbit, will appear stationary to an observer on earth. However, GEO satellites have to be at an altitude of about 23,000 miles to maintain their "stationary" position as viewed from the ground. This large distance attenuates communication signals exchanged with the satellites, which thus require very large antenna systems on the satellites and correspondingly large dishes on the ground. To launch the satellites with these large antennas into orbit, they must be folded and are then unfolded by complex mechanisms when the satellite reaches its intended location. A GEO satellite also needs rocket thrusters to maintain it in its intended orbital location and altitude so that it remains stationary relative to the earth's surface and in the proper attitude to line up its antennas with the ground station antennas.

For purposes of the present disclosure, an LEO satellite is one that orbits at an altitude of about 1,000 miles or less, and thus has an orbital period of about 90 to 120 minutes. At these altitudes, the satellites have much stronger satellite-to-ground radio signal strength, but their high speeds (about 18,000 miles per hour relative to the earth's surface), make creating such links to the ground a challenge. Furthermore, creating routes between far-distant satellites is a complex engineering challenge, and for that reason LEO satellites are frequently placed in orbital patterns where their positions are known within strict limits to facilitate establishing satellite-to-satellite radio links.

One popular method that has been employed utilizes multiple satellites in different polar orbits. In some known polar orbit approaches a "wave" of satellites leaves the North Pole at the same time, and as their orbits spread out, they create a grid of satellites that can communicate with each other by algorithms such as two hops north and three hops east. These methods require that the satellites' onboard rocket thrusters maintain them in precise orientations (about roll, pitch and yaw axes) to ensure that the antennas on different satellites line up for the exchange of radio signals.

In summary, published information on existing GEO and LEO satellite approaches indicates that both require a substantial economic commitment, of magnitudes measured in hundreds of millions of dollars, to create any space-based communication system.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

FIG. 3 comprises FIG. 3A and FIG. 3B, wherein

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

The detailed description that follows is intended to provide specific examples of particular embodiments illustrating various ways of implementing the claimed subject matter. It is written to take into account the level of knowledge of one of ordinary skill in the art to which the claimed subject matter pertains. Accordingly, certain details may be omitted as being unnecessary for enabling such a person to realize the embodiments described herein.

Review of the Applicant's Satellite Communication Technology

An important parameter in a communication system in which an aerial node, such as a satellite, exchanges radio signals with ground nodes and/or other satellites is the distance from the satellite to the horizon on the earth's surface. FIGS. 1A and 1B of the assignee's U.S. Pat. No. 10,979,136 ("the '136 patent) illustrate the relationship between the altitude of an aerial node such as a satellite S and its surface "footprint" defined by the distance from the satellite to the horizon EH. A ground station beyond that distance cannot see the satellite and thus cannot exchange radio signals with it. If the satellite S is at an altitude AL of 200 miles, it will have a footprint on the earth's surface relating to the distance DH=1,280 miles to the horizon EH. This is the radius within which a satellite will theoretically be in line of sight of a point on the ground. The satellite's footprint (the area of the earth's surface visible to the satellite) is $\pi*DH^2 \approx 5,100,000$ sq. mi. By the same token, the distance two satellites in circular orbits at the same altitude can see each other is roughly twice the distance DH. One of the challenges in any satellite-based communication system is to design the satellites and ground stations so that their respective antennas can be paired to create radio links over these large distances.

For reference in the detailed description that follows, the following table sets out for satellites of different altitudes their distances to the horizon (DH), and footprints. It also includes corresponding information for non-orbiting aerial nodes such as drones or balloons at an altitude of 10 miles that can act as nodes in certain systems described herein.

TABLE 1

| Altitude—AL (miles) | Distance to Horizon—DH (miles) | Footprint—$\pi * DH^2$ (sq. mi.) |
| --- | --- | --- |
| 10 (Drone or balloon) | 280 | 250,000 |
| 100 | 900 | 2,500,000 |
| 200 | 1,280 | 5,100,000 |
| 400 | 1,830 | 10,500,000 |
| 500 | 2,000 | 12,500,000 |
| 800 | 2,600 | 21,200,000 |
| 1000 | 3,000 | 28,300,000 |
| 22,230 (Geostationary) | 26,000 | $2.1 \times 10^9$ |

This table reveals one of the trade-offs involved in designing a satellite-based communication system, in that the distance to the horizon and the corresponding footprint increase as the orbit altitude increases, but the strength of the radio signals between satellites and the ground is attenuated as the altitude increases.

The assignee's prior patents relate to specific aspects of the assignee's patented technology that take into account this and other characteristics of space-based satellite communications systems. The assignee's U.S. Pat. No. 10,084,536 issued Sep. 25, 2018 ("the '536 patent"), discloses a method involving launching satellites into low earth orbits without rockets (and rocket fuel) to control orbits and control attitude, and thus to drastically reduce the cost of satellite communication systems. (The '536 patent is incorporated by reference as part of the present disclosure as if set out in full herein.)

The '536 patent discloses a constellation of satellites with directional antennas but no attitude control. As a result, there is no guarantee that any satellite will have an antenna pointed at a particular ground location or at another satellite. Moreover, the orbital paths of the satellites are not controlled, so that route creation and data transmission rely on the probability of linking antennas on satellites to the ground stations and other satellites. An acceptable level of service can be obtained by launching sufficient number of satellites to provide a statistically significant opportunity for route creation, which is possible because the satellites can be made and launched at a very low cost.

The '536 patent introduced the feature of selecting a preferred or optimum route by an algorithm that makes sequential decisions as routing messages are transmitted between satellites and ground stations, and between satellites. The '536 patent describes a system with ground stations that have complex antenna systems that amplify signals from any direction and satellites with antennas distributed around the spherical space surrounding the satellite. This arrangement, coupled with a constellation including a sufficient number of the inexpensive satellites, results in an acceptable statistical probability of creating routes between any two ground stations on demand (or within a reasonable dwell time).

The assignee's satellite communications are based on a different paradigm altogether than prior approaches such as Iridium® fixed polar orbit systems. An example of a system based on the Iridium® approach might consist of satellites in tightly controlled polar orbits at 500-mile altitudes, which would require at least 64 satellites to enable the complete line-of-sight communications necessary to provide worldwide service. The satellites thus would need expensive control systems and heavy rocket thrusters and fuel to maintain them in positions that would ensure that radio links could be made between them and with ground stations. In contrast, a comparable system based on the principles disclosed in the assignee's '536 patent and the others discussed herein, can be effected with about 200 or so lightweight, inexpensive-to-make stochastically distributed satellites without thrusters or rocket fuel to maintain them in a particular attitude or altitude. Such a system could be made and deployed at a small fraction of the cost, likely less by orders of magnitude, than prior space-based systems.

The '536 patent describes certain embodiments based on that paradigm. One example provides a so-called "bent pipe" route, in which a single satellite provides both an up link and a down link. Calculations suggest that at any time a user on the ground will see about 12 satellites in a 220 satellite constellation. This indicates that the probability that an instantaneous up link to a single satellite would be about 30%. The probability of an instantaneous down link from the same satellite would likewise also be about 30%. Thus, the chance that any particular satellite would be available for route creation at any given time is thus 0.30 times 0.30, or 9%.

However, since there are (statistically speaking) about 12 satellites in view of every ground station at any given time, the probability that no link would be available can be estimated by 0.91 to the $12^{th}$ power, or about 68%. In other words, 68% of the time a route would be immediately available. However, since the satellites have no attitude control, they can tumble and change their orientation, so that in perhaps 20 seconds on average the probability of immediate route creation would change. Thus, the chances for a second attempt would be 32% times 32%, or 10% (0.32× 0.32), meaning that the estimated probability of serving an individual customer within 20 seconds is about 90%.

It is anticipated that engineering improvements may be able to increase the percentage of antenna coverage of the spherical space around a satellite will from 30% to 40%. Taking that into account in the above calculations, the probability of a particular satellite being available for a route becomes about 16%, with the chances of none of the 12 satellites in view of a ground location being only $0.84^{12}=12\%$. In other words, 88% of the time a user will be served immediately, and the chances of a user not being served in 20 seconds is only 1.5% (0.12×0.12).

The assignee's U.S. Pat. No. 10,447,381 issued Oct. 15, 2019, discloses spinning the satellites around an axis at about one revolution of per second. This provides within a one-second time period approximately six additional chances to incorporate a particular satellite into a route. The assignee's U.S. Pat. No. 10,085,200 issued Sep. 25, 2018, and U.S. Pat. No. 10,291,316 issued May 14, 2019, disclose numerous refinements, variations, and improvements of some of the basic concepts in the patents just discussed, including the use of directional antennas each having multiple feeds (the '200 patent), and systems in which each satellite knows its own orbit, and shares the information with other satellites (the '316 patent).

The assignee's U.S. Pat. No. 10,979,136 ("the '136 patent") describes advanced routing protocols and satellite designs based on the fundamentals of the assignee's satellite communications approach described in the patents just discussed. The disclosed routing methods create preferred multi-link routes utilizing a quality of radio signals, such as signal strength, received by system nodes (earthbound or aerial) from other nodes. The routing protocols and satellite designs described in the '136 patent are inherently capable of creating routes that include radio links between aerial nodes at different altitudes, including drones, LEO satellites, GEO satellites, and even satellites at other altitudes.

In that respect, one approach would create a high altitude backbone of satellites in orbits about 1,000 miles altitude (45-60 satellites) plus satellites in very low earth orbits ("VLEO") of only 300 miles altitude (980 satellites) to provide enhanced signal strength for earthbound users with either poor antennas systems and/or in buildings.

Improved Data Transmission Using Diversity Principles

The assignee's space based communications systems support the transmission of data (content) between far distant ground stations. However, it is also important to ensure the accuracy of the content of data reaching its destination ground station via systems that rely on radio links between satellites without means for controlling their location or attitude. There are numerous radio technologies available for transmitting data between terrestrial and aerial nodes of distributed systems such as those described in the assignee's prior patents and applications. Examples of technologies that can be used to implement the data transmission methods described herein include (i) frequency modulation, (ii) code division, such as CDMA (code division multiple access), (iii) time division, such as TDMA (time division multiplexing), and (iv) frequency division, such as FDMA (frequency division multiple access). These technologies are already used in various combinations in cellular radio telephony. (In the description that follows, the terms "radio technology" and "signal format" are used interchangeably.)

The concept known as diversity can improve the integrity of signals received at the satellites and terrestrial nodes. In the present context, "diversity" refers to:

a. Signal format diversity, in which content is sent multiple times in the same signal format, with each transmission being altered in a predetermined manner, or multiple times in different signal formats, as described below in connection with FIG. 4 below.

b. Space diversity, in which content is sent multiple times over different signal paths, as described in the assignee's provisional application No. 63/182,341 ("the '341 application").

c. Combined diversity, in which the same content is sent over in different signal paths using signal format diversity in each path, as described below in connection with FIG. 5.

In one implementation of these diversity techniques, the content in each transmission is divided into short segments, with multiple error checking codes added between the segments. A computer at the receiving end compares the respective segments and re-creates the content with few or no errors.

These diversity approaches can be applied to the assignee's space-based communications systems to greatly improve the accuracy of the content transmitted via satellites or other, non-orbiting aerial nodes, such as free-floating balloons and/or unmanned aerial vehicles (drones). In one exemplary version of such a system, a ground station in Cairo, Egypt, is connected by cable to the internet. A system goal is to provide internet service to a remote user located in southern Egypt, via a constellation of satellites in uncontrolled orbits. A preferred route involving one or more satellite nodes is created in accordance with the principles described in the assignee's above discussed prior patents and applications. By way of terminology, the route is created by routing messages sent from a "sending" ground station (remote Egypt), then from one or more satellites, and finally received at a "receiving" ground station (Cairo). Content, sometimes referred to herein as data, is then transmitted from Cairo, now acting as an "originating" ground station, to remote Egypt, which in this context is the "destination" ground station.

Certain route creation methods described in the assignee's patents and applications discussed above involve keeping track at a receiving ground station at Cairo a preferred antenna identified during route creation to use for data transmissions from the sending ground station at remote Egypt (now acting as a destination ground station) to the receiving ground station Cairo (now acting as the originating ground station). Examples of methods used to create radio routes over which data is transmitted according to the present disclosure are described in the '536 patent, '136 patent, and the '341 application. Those descriptions are incorporated by reference as if set out in full herein.

Figure 1:
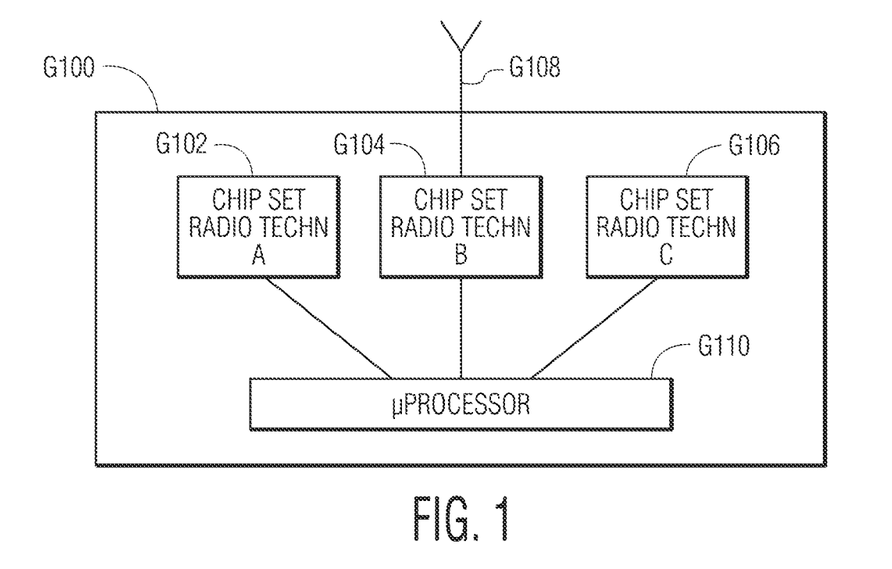
FIG. 1 is a schematic diagram of a ground station (terrestrial node) with a single omnidirectional antenna and three different radio technologies available for data communications.
Figure 2:
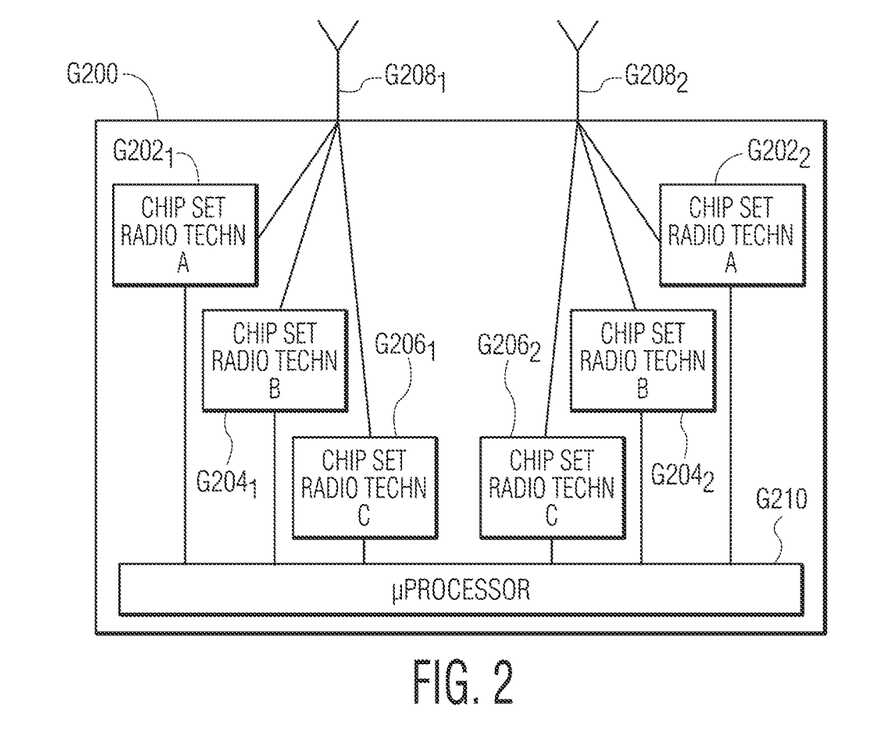
FIG. 2 is a schematic diagram of a ground station having two omnidirectional antennas each of which is associated with three different radio technologies available for data communications.

FIGS. 1-3 describe ground station and satellite constructions that can implement the diversity techniques described further below in connection with FIGS. 4 and 5. FIG. 1 shows a ground station G100 that includes three separate chip sets G102, G104, G106 for coding and decoding radio signals in three respective radio technologies. The chip sets are designated "Radio Techn A," "Radio Techn B," and "Radio Techn C," representing, for example, frequency modulation, code division (e.g., CDMA), and time division (e.g., TDMA), respectively. Other technologies (signal formats), or additional technologies with their own respective chip sets, can also be used, as described further below in connection with FIGS. 4 and 5. The chip sets are connected to an antenna G108 for sending and receiving radio signals and a processor G110 that selects which radio technology to use for transmitting the data as described in detail below in connection with FIGS. 4 and 5.

FIG. 2 illustrates the application of the three radio technologies discussed in connection with FIG. 1 to a ground station G200 with two antennas. ("200" series references used with FIG. 2 designate counterparts of the "100" series references in FIG. 1.) In this embodiment there is a first group of three individual chip sets G202$_1$, G204$_1$, and G206$_1$, and a second group of individual chip sets G202$_2$, G204$_2$, and G206$_2$. Each of the chips sets is associated with a respective one of the radio technologies in a like fashion to that described in connection with FIG. 1. The chip set groups are connected to respective antennas G208$_1$ and G208$_2$ in like fashion as the chip sets and antenna described in connection with FIG. 1. A processor G210 selects which radio technology to use to transmit data from the antennas as described further below in connection with FIGS. 4 and 5. Many types of "ground stations," such as smartphones, have multiple antennas. FIG. 2 illustrates how the diversity principles described herein can be employed those types of ground stations.

Figure 3A:
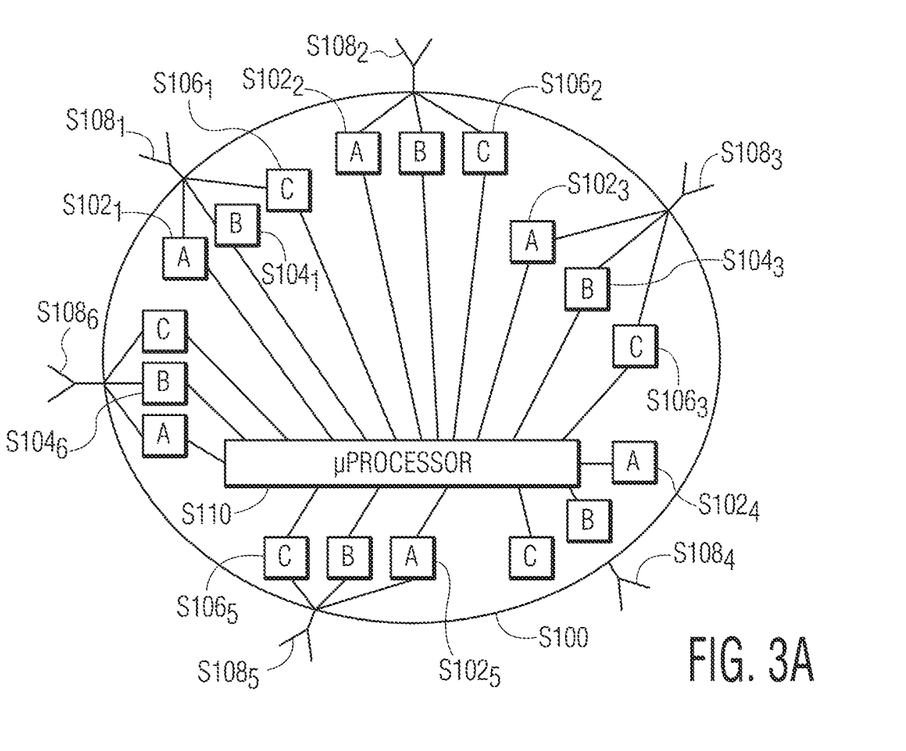
FIG. 3A depicts a satellite configuration having six directional antennas, each of which is associated with three different radio technologies available for data transmissions.
Figure 3B:
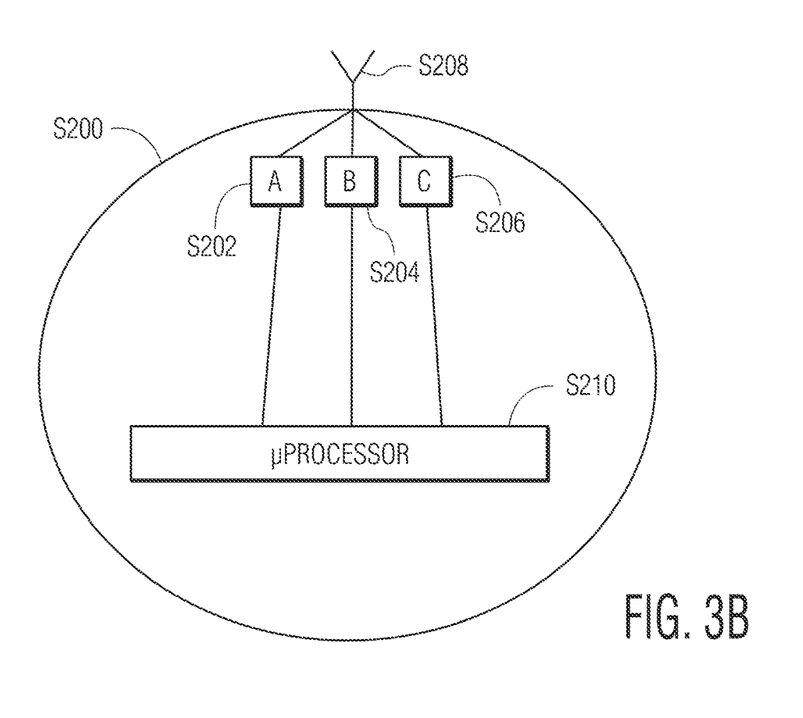
FIG. 3B depicts a satellite configuration having a single omnidirectional antennas associated with three different radio technologies available for data transmissions.

FIG. 3 consists of FIGS. 3A and 3B, which are schematic depictions of satellites in a constellation that supports communications between ground stations such as those shown in FIGS. 1 and 2 that employ different radio technologies. FIG. 3A shows a satellite S100 with six groups of chip sets associated with the respective radio technologies. As shown in FIG. 3A, each chip set group S102$_n$, S104$_n$, and S106$_n$ has a directional antenna S108$_n$ associated with it, where n=6 in the FIG. 3A embodiment. (Some references to the chip sets are omitted from FIG. 3A for clarity.) The satellite S100 further includes a processor S110 for selecting which signal format to use to transmit data from its associated antenna in accordance with the transmission methods described below in connection with FIGS. 4 and 5. FIG. 3B shows an alternate satellite embodiment S200 having a single group of chip sets S202, S204, and S206 associated with the respective radio technologies "A," "B," and "C" as depicted in the drawing. The satellite S200 includes a single omnidirectional antenna S208 and a processor S210 for selecting the appropriate signal format for transmission. These figures illustrate how the diversity principles discussed herein can implement data transmission methods using different satellite embodiments such as those described in the assignee's prior patents and applications.

Figure 4:
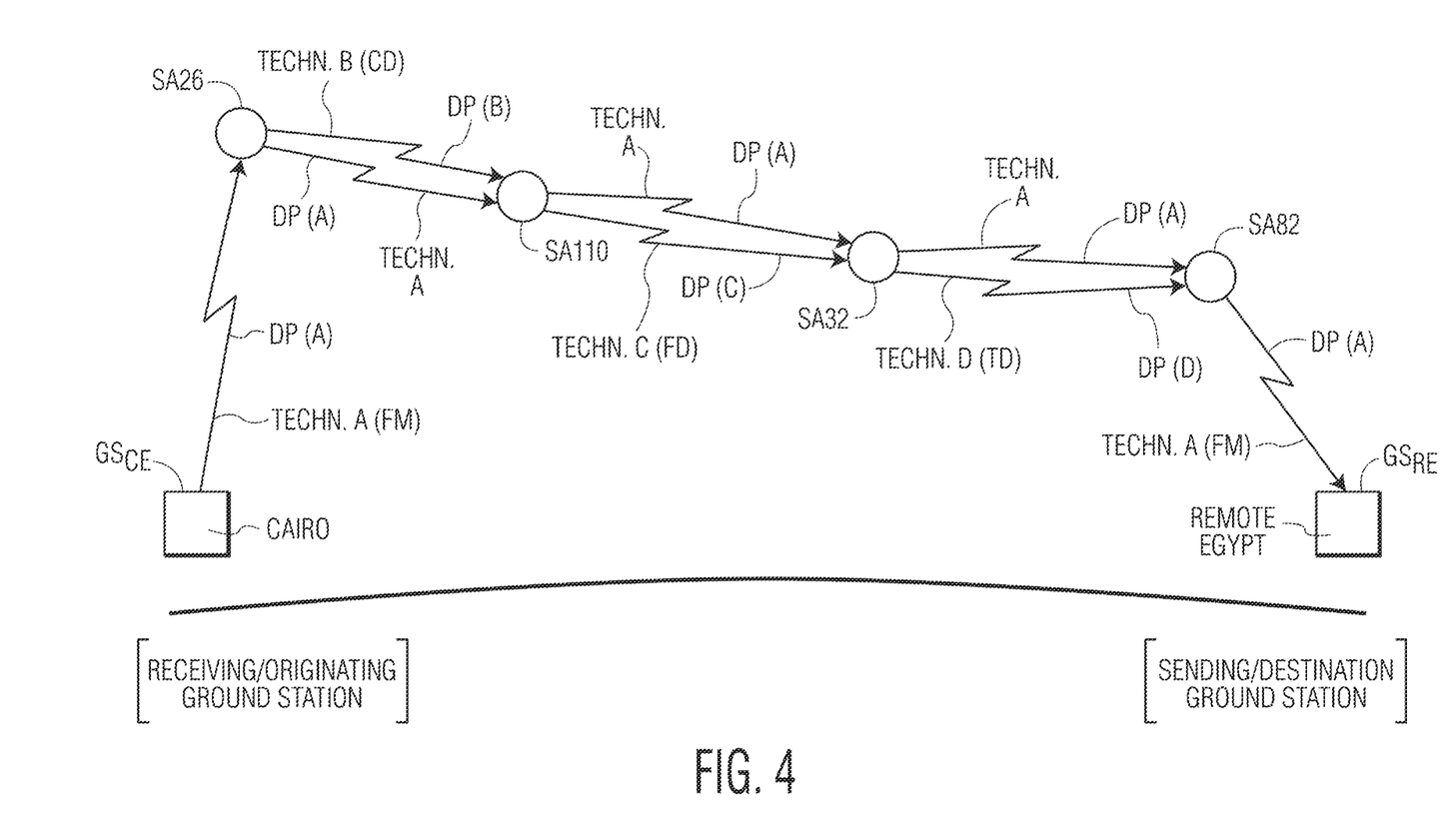
FIG. 4 illustrates the use of radio technology diversity in a multi-satellite radio route for data transmissions between two ground stations.

FIG. 4 illustrates a method in which the following exemplary radio technologies (signal formats) are available for data transmission:

Technology A—Frequency modulation ("FM")
Technology B—Code division ("CD")
Technology C—Frequency division ("FD")
Technology D—Time division ("TD")

The selection of a particular protocol for application of the diversity principles described herein can be made in accordance with various algorithmic approaches, described just below in connection with FIGS. 4 and 5. As already noted, space diversity techniques described in the '341 application can be used in addition to the various signal diversity techniques described herein (see FIG. 5).

Referring again to FIG. 4, the sending and receiving ground stations will be configured as discussed above in connection with FIG. 1 or 2 depending on the particular implementation. In the present example, the ground stations will have four different chip sets, one for each of the routing technologies A through D listed above. The satellites will be configured as discussed above in connection with FIG. 3A or 3B, and as with the ground stations, each satellite will have four different chip sets, one for each of the listed routing technologies. In other words, the ground stations and the satellites are capable of coding and decoding data transmissions in any of the listed technologies or signal formats A through D.

FIG. 4 illustrates one example of transmitting data through a constellation comprising 220 satellites via a five-link route created according to any of the route creation protocols for data transmission from a Cairo ground station GS$_{CE}$ (serving as a "receiving/originating" ground station) to a remote Egypt ground station GS$_{RE}$ (serving as a "sending/destination" ground station). The route will thus transmit a data packet from Cairo via satellite SA26, satellite SA110, satellite SA32, satellite SA82, and the remote Egypt ground station. As explained in the assignee's prior patents and applications, this route will have been selected from other possible data transmission routes from Cairo to remote Egypt by using the protocols described therein.

FIG. 4 traces the transmission of a data packet DP from the Cairo originating station GS$_{CE}$ via the illustrated four-satellite route to the remote Egypt ground station GS$_{RE}$. In this example, these ground stations are programmed to send and receive only in radio technology A (FM), without using diversity principles, as indicated by the notation DP(A) associated with the signal arrow from the Cairo ground station GS$_{CE}$ to the satellite S26 and the signal arrow from the satellite S82 to the remote Egypt ground station GS$_{RE}$. Frequency modulation is chosen for ground/satellite data transmissions because it is already in widespread use for cellular telephony and thus will require minimal modification of the operation of existing ground stations. However, in other implementations the signal format diversity techniques described below for satellite-to-satellite communications can be applied to ground/satellite communications.

One method of implementing the diversity techniques according to the principles described in the present disclosure is to send two data packets with the same content in two different signal formats. If each version of the data packet comprises 200 bytes, an error detecting code could be inserted every 20 bytes, resulting in the transmission of 10 different segments that can be checked for errors. The node receiving the two data packets would then perform a segment-by-segment comparison between them and choose which segments to use to reconstruct the 200 byte data packet. In other words, the processors in the satellites can assemble the best of the 20-byte segments into a single 200-byte packet to recreate the content transmitted from the node that sent the two data packets.

In the FIG. 4 embodiment, the notation "DP(X)" used for satellite-to-satellite data transmission follows the convention whereby "X" is the signal format. When the satellite S26 receives the data packet from the Cairo ground station GS$_{CE}$, it decodes it using its chip set dedicated to Technology A (frequency modulation). See FIG. 3. In the present embodiment each satellite will use Technology A as one of the technologies to provide signal format diversity in the satellite-to-satellite links in the radio route. The processor S110 or S210 in the satellite SA26 then decides which signal format B, C, or D to use in combination with Technology A. This can be accomplished by using a look-up table in the satellite that was populated during route creation. As described in the assignee's prior patents and applications, particularly the '536 patent and the '341 application, each satellite will have stored the identity of the antenna to use to transmit the data to the next node in the route. Each satellite will also determine during the route creation process a parameter called "quality," which indicates the relative integrity of the link to the next node in the route via the associated antenna. During route creation the processor in each satellite will have stored in the look-up table the quality of the link associated with the antenna that will be used to transmit the data to the next satellite. It will be understood from the assignee's prior patents and applications that in the assignee's systems a particular satellite may store the identities of many antennas and their respective qualities corresponding to each of a plurality of routes between different ground stations.

In an exemplary implementation, a code division technology such as Code Division Multiple Access (also known as "spread spectrum") can be used as Technology B for lower quality links because it is known to perform well over noisy radio channels. For intermediate quality signals, a time division technology such as Time Division Multiple Access could be used because it involves sending two separate signals, thus increasing the probability that the data packet can be accurately re-assembled. For qualities in the highest range, a frequency division technology that may be more prone to interference, such as such as Frequency Division Multiple Access could be used to take advantage of the fact that the two data transmissions can be made simultaneously from the same antenna.

In operation the satellite SA110 receives the two versions of the data packet, DP(A) and DP(B), and performs error correction as described above and transmits the corrected data packets on to satellite SA32 using the antenna identified during route creation. The satellite SA110 consults its look-up table associated with that antenna and determines that the corrected data packet should be transmitted using Technology C as DP(C) in combination with Technology A as data packet DP(A). Data transmission proceeds in this fashion from satellite to satellite. In FIG. 4, it is assumed that the data packet corrected at the satellite SA32 will be forwarded to the satellite SA82 using Technology D, i.e., as DP(D), and, as noted in FIG. 4, using Technology A, i.e., as DP(A). When the data reaches a satellite having an antenna associated with the destination remote Egypt ground station $GS_{RE}$, it transmits the data accordingly.

The system depicted in FIG. 4 and described above can be modified in numerous ways depending on different deployment strategies and the environment in which the system will be used. For example, it will be readily apparent to one knowledgeable in radio technology that signal format diversity can be applied to satellite/ground station data transmissions. In addition, complete signal format diversity between the system nodes can also be employed. For example, instead of having one signal format such as frequency modulation as one of the signal formats between all of the satellites, it is within the scope of the invention to have other node-to-node signal format diversities. As another example of a variation within the scope of the invention, the satellites can be configured with downward facing antennas as described in connection with FIG. 12 of the '136 patent. In that case, a satellite would know that the data packet it has on board is directed to a ground station because the designated antenna for transmission thereof is pointing downward toward the earth. It will also be appreciated that a system such as that depicted in FIG. 4 can support cellular telephony in which separate frequency bands would be used for communications between the satellite SA82 and the remote Egypt ground station $GS_{RE}$.

Figure 5:
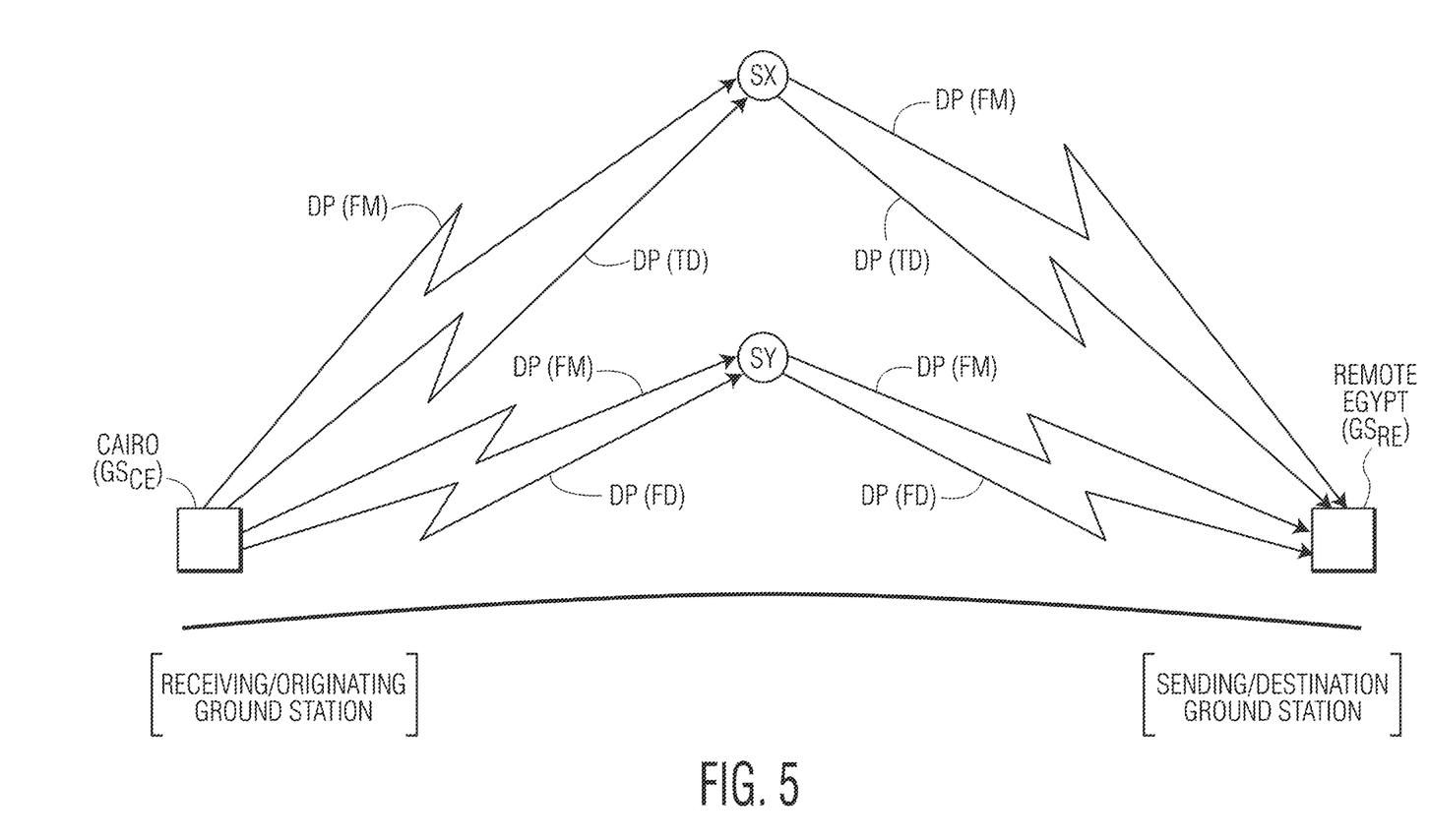
FIG. 5 illustrates the use of space diversity in combination with radio technology diversity for data transmissions between two ground stations.

FIG. 5 schematically illustrates a system that employs space diversity in combination with two different types of signal format diversity. In the figure the signal format diversities are time division diversity and frequency division diversity, but it will be appreciated that any of the various signal formats can be used to implement this aspect of the system depicted in FIG. 5. The system also incorporates space diversity by sending the same data packet via two different routes in the manner described in the '341 application. It will be appreciated that FIG. 5 illustrates a bent pipe system, but the space/technology diversity protocol described here can also be applied to a route with one or more satellite-to-satellite links.

FIG. 5's notation is similar to that used in connection with FIG. 4. The data packets sent from the Cairo ground station $GS_{CE}$ are designated by the notation "DP(TD)" for data packets sent using a time division signal format, and "DP(FM)" denotes data packets sent using a frequency modulated signal format. As described in the "Space Diversity" section of the '341 application, the routing protocol will have identified at least two separate routes for sending data content to the remote Egypt ground station $GS_{RE}$. The Cairo ground station will store the identities of the antennas on which it received routing signals from different satellites and the respective routing signal qualities. The processing circuitry will identify the antennas associated with the two highest quality routing messages received from satellites in the constellation.

Signal format diversity is added by sending the same data packet from both of those antennas in different signal formats. As noted in the previous paragraph, the data packet is sent from each ground station antenna in a time division signal format and a frequency division data format. These two signals are received by each of the satellites SX and SY, which perform the error correction and re-assembly of the received different data packet versions discussed above. Each satellite then sends the corrected data packet in two formats (time division and frequency modulation) on its antennas identified during route creation as being linked with the remote Egypt ground station $GS_{RE}$. The remote Egypt ground station thus has four versions of the same data packet in 10 segments, each having an error correction code associated with it. The processing circuitry (see FIGS. 1 and 2) in the remote Egypt ground station applies the appropriate error correction algorithm to each segment and reassembles the data packet using the segments with the fewest errors. In this fashion, the data packet has been subjected to three kinds of diversity to ensure the integrity of the content transmitted from Cairo even further.

Those skilled in the art will readily recognize that only selected preferred embodiments of the invention have been depicted and described, and it will be understood that various changes and modifications can be made other than those specifically mentioned above departing from the spirit and scope of the invention, which is defined solely by the claims that follow.

What is claimed is:

1. A radio communication system comprising a plurality of aerial nodes providing a radio route for transmitting data to a destination node via at least one of said aerial nodes, wherein each of a plurality of said aerial nodes includes:
   at least one antenna for receiving and transmitting radio signals; and
   coding/decoding circuitry for coding a packet of the data multiple times using respective different radio technologies for multiple transmissions of said coded data by one said antenna in said respective different radio technologies and decoding multiple transmissions of a coded packet of data received on one said antenna from another node and coded using respective different radio technologies, wherein any node receiving said multiple transmissions of a coded packet of data decodes the coded packet received in each transmission and reassembles the data packet from the multiple different transmissions.

2. A radio communication system as in claim 1, wherein said coding/decoding circuitry is configured for coding and decoding data packets using at least three radio technologies selected from frequency modulation, code division, frequency division, and time division.

3. A radio communication system as in claim 2, wherein said coding/decoding circuitry includes multiple circuit components, each being dedicated to coding and decoding data packets in one of said radio technologies.

4. A radio communication system as in claim 3, wherein multiple said aerial nodes include a single omnidirectional antenna for transmitting data packets coded in said at least three radio technologies and decoding data packets received in said at least three radio technologies.

5. A radio communication system as in claim 3, wherein:
multiple said aerial include a plurality of antennas spaced apart around the periphery of the aerial nodes;
said coding/decoding circuitry includes a like plurality of separate coding/decoding chip sets each associated with a respective said antenna; and
each said chip set includes multiple circuit components dedicated to coding and decoding data packets in respective ones of said multiple radio technologies.

6. A radio communication system as in claim 5, wherein said coding/decoding circuitry in said multiple aerial nodes is configured for coding data packets for transmission in four radio technologies and for decoding data packets received in the same four radio technologies.

7. A radio communication system as in claim 6, wherein the four radio technologies comprise frequency modulation, code division, frequency division, and time division.

8. A radio communication system as in claim 7, wherein the code division radio technology comprises code division multiple access, the frequency division radio technology comprises frequency division multiple access, and the time division radio technology comprises time division multiplexing.

9. A radio communication system as in claim 1, wherein:
the data packet comprises content divided into segments, with each segment including error correction coding; and
each said aerial node includes processing circuitry for generating error-corrected content by applying error correction to each segment received in said multiple transmissions and reassembling the data packet from the separate error-corrected segments deemed to have the fewest errors.

10. A radio communications system as in claim 1, wherein the aerial nodes comprise a constellation of multiple satellites in uncontrolled, stochastically distributed orbits.

11. A radio communications system as in claim 10, wherein the destination node is a ground station.

12. A radio communications system as in claim 1, wherein the aerial nodes comprise a non-orbiting unmanned aerial vehicles or free-floating balloons or both.

13. A method of transmitting data from an originating terrestrial node to a destination terrestrial node via a radio route comprising a plurality of aerial nodes wherein each aerial node has at least one antenna for receiving and transmitting radio signals and each terrestrial node has at least one antenna for receiving and transmitting radio signals in different directions, the method comprising:
receiving at the originating terrestrial node an original packet of data including an address designating the destination terrestrial node;
using coding circuitry at said originating terrestrial node to code the data packet for multiple transmissions in different signal formats and transmitting the coded data packet from at least one said antenna of the originating terrestrial node at least two times for reception by at least two aerial nodes in the radio route, wherein a first terrestrial transmission transmits the data packet in multiple signal formats in a first predetermined direction associated with the destination terrestrial node address, and a second terrestrial transmission transmits the data packet in multiple signal formats in a second predetermined direction associated with the destination terrestrial node address, at least one of said multiple transmissions comprising said second terrestrial transmission being in a signal format different from any signal format comprising the first terrestrial transmission;
using decoding circuitry in said first aerial node to decode the coded data packet received in said multiple signal formats to produce a first reassembled data packet;
using coding circuitry in said first aerial node to code the first reassembled data packet for transmission in a predetermined direction associated with the destination terrestrial node address, wherein said transmission transmits the first reassembled data packet from the first aerial node multiple times, at least two of said transmissions being in different signal formats;
using decoding circuitry in said second aerial node to decode the coded data packet received in said multiple signal formats to produce a second reassembled data packet;
using coding circuitry in said second aerial node to code the second reassembled data packet for transmission in a predetermined direction associated with the destination terrestrial node address, wherein said transmission transmits the second reassembled data packet from the second aerial node multiple times, at least two of said transmissions being in different signal formats and at least one of said transmissions being in a signal format different from any of the transmissions from the first aerial node; and
using decoding circuitry at said destination terrestrial node to decode all of the multiple transmissions of reassembled data packets received by the destination terrestrial node in different signal formats to produce a final data packet intended to re-create at the destination terrestrial node the original packet of data received at the originating terrestrial node.

14. A method as in claim 13, wherein:
each data packet comprises content divided into segments, with each segment including error correction coding; and
each terrestrial node and aerial node includes processing circuitry for generating error-corrected content by applying error correction to each segment received in said multiple transmissions and reassembling the data packet from the separate error-corrected segments deemed to have the fewest errors.

15. A method as in claim 14, wherein:
the originating terrestrial node transmits the original data packet in the first predetermined direction in first and second signal formats and in the second predetermined direction in the first signal format and a third signal format different from the second signal format;

the first aerial node transmits the first reassembled data packet in the first and second signal formats; and the second aerial node transmits the second reassembled data packet in the first signal format and the third signal format.

16. A method as in claim 15, wherein the first aerial node is in a first preferred route to the destination terrestrial node and the second aerial node is in a second preferred route to the destination terrestrial node.

17. A method as in claim 15, wherein said multiple signal formats are chosen from the group comprising frequency modulation, code division, frequency division, and time division.

18. A method as claim 17, wherein the code division signal format comprises code division multiple access, the frequency division signal format comprises frequency division multiple access, and the time division signal format comprises time division multiplexing.

19. A method of transmitting data via a radio route comprising multiple aerial nodes, wherein each of a plurality of said aerial nodes includes:

at least one antenna for receiving and transmitting radio signals; and coding/decoding circuitry for coding a packet of the data multiple times using respective different radio technologies for multiple transmissions of said coded data by one said antenna in said respective different radio technologies and decoding multiple transmissions of a coded packet of data received on one said antenna from another node and coded using said respective different radio technologies, said data packet comprising content divided into segments, with each segment including error correction coding, the method comprising:

receiving at a first aerial node multiple transmissions of a first coded data packet coded using said respective different radio technologies;

producing a first reassembled data packet by decoding the first coded data packet received at the first aerial node, applying error correction to each segment received at said first aerial node, and reassembling the data packet from the separate error-corrected segments deemed to have the fewest errors; and coding the first reassembled data packet for transmission from the first aerial node multiple times using different radio technologies, at least two of said transmissions being coded using different radio technologies, at least one of which is different from any radio technology used to code the first coded data packet.

20. A method as in claim 19, wherein:

the first coded data packet comprises two transmissions coded using respective first and second radio technologies signal formats; and the reassembled data packet is coded for transmission twice, once using the first radio technology and once using a third radio technology.

21. A method as in claim 19, wherein the aerial nodes comprise non-orbiting unmanned aerial vehicles or free-floating balloons or both.

22. A method as in claim 19, wherein the aerial nodes comprise a constellation of multiple satellites in uncontrolled, stochastically distributed orbits.

23. A method of transmitting data via a radio route comprising multiple aerial nodes, wherein each of a plurality of said aerial nodes includes:

at least one antenna for receiving and transmitting radio signals; and coding/decoding circuitry for coding a packet of the data for multiple transmissions by one said antenna in multiple signal formats different from each other and decoding a coded packet of data received from another aerial node on one said antenna in said multiple different signal formats, said data packet comprising content divided into segments, with each segment including error correction coding, the method comprising:

receiving at a first aerial node multiple transmissions of a first coded data packet comprising two transmissions in respective first and second signal formats;

producing a first reassembled data packet by decoding the coded data packet received at the first aerial node in said multiple signal formats, applying error correction to each segment received at said first aerial node, and reassembling the data packet from the separate error-corrected segments deemed to have the fewest errors;

coding the first reassembled data packet for transmission of the first reassembled data packet from the first aerial node two times, once in the first signal format and once in a third signal format:

producing a second reassembled data packet by decoding the first reassembled data packet received at a second aerial node in said first and third signal formats, applying error correction to each segment received at said second aerial node, and reassembling the data packet from the separate error-corrected segments deemed to have the fewest errors; and coding the second reassembled data packet for transmission from the second aerial node twice, once in the first signal format and once in a fourth signal format.

24. A method as in claim 23, wherein said four signal formats comprise frequency modulation, code division, frequency division, and time division.

25. A method as claim 24, wherein the code division signal format comprises code division multiple access, the frequency division signal format comprises frequency division multiple access, and the time division signal format comprises time division multiplexing.

26. A method of transmitting data via a radio route to a destination node comprising multiple aerial nodes, wherein each of a plurality of said aerial nodes includes:

at least one antenna for receiving and transmitting radio signals; and coding/decoding circuitry for coding a packet of the data multiple times using respective different radio technologies for multiple transmissions of said coded data by one said antenna in respective different radio technologies and decoding multiple transmissions of a coded packet of data received on one said antenna from another node and coded using said respective different radio technologies, said data packet comprising content divided into segments, with each segment including error correction coding, the method comprising:

receiving at a first aerial node multiple transmissions of a first coded data packet coded using said respective different radio technologies and including an address of a destination terrestrial node;

producing a first reassembled data packet by decoding the first coded data packet received at the first aerial node, applying error correction to each segment received at said first aerial node, and reassembling the data packet from the separate error-corrected segments deemed to have the fewest errors; and coding the first reassembled data packet using different radio technologies for transmission in a predetermined direction associated with the destination terrestrial node address included in the first coded data packet, wherein said transmission transmits the first reassembled data packet from the first aerial satellite node multiple times, at least two of said transmissions being coded using different radio technologies, at least one of which is different from any radio technology used to code the first coded data packet.

27. A method as in claim 26, wherein the aerial nodes comprise non-orbiting unmanned aerial vehicles or free-floating balloons or both.

28. A method as in claim 26, wherein the aerial nodes comprise a constellation of multiple satellites in uncontrolled, stochastically distributed orbits.

29. A method of transmitting data from an originating terrestrial node to a destination terrestrial node via a radio route comprising a plurality of aerial nodes wherein each aerial node has at least one antenna for receiving and transmitting radio signals and each terrestrial node has at least one antenna for receiving and transmitting radio signals in different directions, the method comprising:

receiving at the originating terrestrial node a packet of data including an address designating the destination terrestrial node; and transmitting the data packet from the originating terrestrial node at least two times for reception by at least two aerial nodes in the radio route, wherein a first terrestrial transmission transmits the data packet in a first predetermined direction for receipt by a first aerial node associated with the destination terrestrial node address, and a second terrestrial transmission transmits the data packet in a second predetermined direction for receipt by a second aerial node associated with the destination terrestrial node address.

30. A method as in claim 29, wherein the originating terrestrial node comprises two directional antennas for transmitting the respective first and second terrestrial transmissions.

31. A method of transmitting data from an originating terrestrial node to a destination terrestrial node via a radio route comprising a plurality of aerial nodes wherein each aerial node has at least one antenna for receiving radio signals and each terrestrial node has at least one antenna for receiving and transmitting radio signals, the method comprising:

receiving at the originating terrestrial node an original packet of data including an address designating the destination terrestrial node; and using coding circuitry at said originating terrestrial node to code the packet of data multiple times using different signal formats and transmitting the coded data packet from the originating terrestrial node on one said antenna in respective said signal formats for receipt by one said antenna of one said aerial node.

32. A method as in claim 31, further comprising transmitting the coded data packet from the originating terrestrial node at least two times for reception by at least two aerial nodes in the radio route, wherein a first terrestrial transmission transmits the data packet in a first predetermined direction for receipt by a first aerial node associated with the destination terrestrial node address, and a second terrestrial transmission transmits the data packet in a second predetermined direction for receipt by a second aerial node associated with the destination terrestrial node address.

* * * * *

UNITED STATES PATENT AND TRADEMARK OFFICE
CERTIFICATE OF CORRECTION

| | |
|---|---|
| PATENT NO. | : 11,870,543 B2 |
| APPLICATION NO. | : 17/322950 |
| DATED | : January 9, 2024 |
| INVENTOR(S) | : Gerald R. Schloemer |

It is certified that error appears in the above-identified patent and that said Letters Patent is hereby corrected as shown below:

In the Claims

Column 11, Line 23, should read --multiple said aerial nodes include a plurality of antennas spaced--

Column 11, Line 61, should read --the aerial nodes comprise non-orbiting unmanned aerial--

Column 15, Line 8, should read --sembled data packet from the first aerial node--

Signed and Sealed this
Sixth Day of February, 2024

Katherine Kelly Vidal
*Director of the United States Patent and Trademark Office*